(12) United States Patent
Schottler et al.

(10) Patent No.: US 7,440,821 B1
(45) Date of Patent: Oct. 21, 2008

(54) METHOD OF DETERMINING AVERAGE CURRENT IN A PWM DRIVE

(75) Inventors: Joseph J. Schottler, Crystal, MN (US); John C. Stafney, Clearwater, MN (US)

(73) Assignee: Sauer-Danfoss Inc., Ames, IA (US)

( * ) Notice: Subject to any disclaimer, the term of this patent is extended or adjusted under 35 U.S.C. 154(b) by 329 days.

(21) Appl. No.: 10/751,312

(22) Filed: Jan. 2, 2004

(51) Int. Cl.
G05D 7/00 (2006.01)
G05D 11/00 (2006.01)

(52) U.S. Cl. .................................................... 700/282
(58) Field of Classification Search .................. 91/361; 381/94.3, 71.14; 341/143; 307/151, 64; 323/283
See application file for complete search history.

(56) References Cited

U.S. PATENT DOCUMENTS

| | | | |
|---|---|---|---|
| 4,138,632 A * | 2/1979 | Pauwels et al. ............. 318/599 |
| 4,437,385 A * | 3/1984 | Kramer et al. ............... 91/361 |
| 4,490,841 A * | 12/1984 | Chaplin et al. ........... 381/71.14 |
| 5,012,722 A * | 5/1991 | McCormick ................. 91/361 |
| RE33,846 E * | 3/1992 | Kramer et al. ............... 91/361 |
| 5,341,298 A * | 8/1994 | Singleton et al. .............. 701/91 |
| 5,381,336 A * | 1/1995 | Shorkey ....................... 701/41 |
| 5,398,286 A * | 3/1995 | Balestri et al. ............. 381/94.3 |
| 5,414,339 A * | 5/1995 | Masaki et al. ............... 318/800 |
| 5,553,683 A | 9/1996 | Wenzel et al. |
| 5,704,200 A * | 1/1998 | Chmielewski et al. ..... 56/10.2 E |
| 5,915,313 A * | 6/1999 | Bender et al. ............... 111/178 |
| 5,938,947 A * | 8/1999 | Takano et al. ............... 219/110 |
| 6,201,720 B1 * | 3/2001 | Tracy et al. .................... 363/95 |
| 6,204,650 B1 * | 3/2001 | Shimamori ................. 323/283 |
| 6,233,511 B1 * | 5/2001 | Berger et al. .................. 701/50 |
| 6,249,418 B1 * | 6/2001 | Bergstrom .................. 361/152 |
| 6,347,753 B1 * | 2/2002 | Anderson .................... 239/677 |
| 6,430,220 B1 | 8/2002 | Determan |
| 6,433,720 B1 | 8/2002 | Libove et al. |
| 6,492,821 B1 | 12/2002 | Marko et al. |
| 6,580,247 B2 * | 6/2003 | Nakazawa ................... 318/700 |
| 6,580,260 B2 | 6/2003 | Takita |
| 6,640,834 B1 * | 11/2003 | Hamkins et al. ........ 137/625.65 |
| 6,657,575 B2 * | 12/2003 | Poletto ........................ 341/164 |
| 6,727,832 B1 * | 4/2004 | Melanson .................... 341/143 |
| 6,801,382 B2 * | 10/2004 | Kimura et al. ............ 360/73.03 |
| 6,859,631 B2 * | 2/2005 | Suzumi et al. ................. 399/66 |
| 6,927,561 B1 * | 8/2005 | Schottler ................. 324/117 R |
| 6,975,146 B1 * | 12/2005 | Schottler .................... 327/108 |
| 7,247,955 B2 * | 7/2007 | Tracy et al. .................. 307/151 |

OTHER PUBLICATIONS

Wikipedia, the free encyclopedia, http://en.wikipedia.org/wiki/PID_controller.*
CMOS outlier rejection circuit Vlassis, S.; Siskos, S.; Circuits and Systems I: Fundamental Theory and Applications, IEEE Transactions on [see also Circuits and Systems I: Regular Papers, IEEE Transactions on] vol. 48, Issue 7, Jul. 2001 pp. 910-914 Digital Object Identifier 10.1109/81.933335.*

(Continued)

*Primary Examiner*—Michael B Holmes

(57) ABSTRACT

A method of yielding the average current in a PWM driven coil for an electrohydraulic valve. The method includes transmitting a feedback signal into a Finite Impulse Response filter to take multiple signal samples in order to calculate and average value of current within one cycle. This average value is transmitted to an algorithm that generates a pulse width signal that drives the coil of the electrohydraulic valve in the next system cycle.

9 Claims, 1 Drawing Sheet

OTHER PUBLICATIONS

CMOS outlier rejection circuit Vlassis, S.; Siskos, S.; Circuits and Systems, 2000. Proceedings. ISCAS 2000 Geneva. The 2000 IEEE International Symposium on vol. 5, May 28-31, 2000 pp. 729-732 vol. 5 Digital Object Identifier 10.1109/ISCAS.2000.857605.*

Static electromigration analysis for signal interconnects Chanhee Oh; Blaauw, D.; Becer, M.; Zolotov, V.; Panda, R.; Dasgupta, A.; Quality Electronic Design, 2003. Proceedings. Fourth International Symposium on Mar. 24-26, 2003 pp. 377-382 Digital Object Identifier 10.1109/ISQED.2003.1194762.*

A new duty cycle parallel control method and FPGA implementation for AC-DC converters with power factor correction (PFC) Zhang, W.; Feng, G.; Liu, Y-F.; Wu, B.; Applied Power Electronics Conference and Exposition, 2005. APEC 2005. Twentieth Annual IEEE vol. 2, Mar. 6-10, 2005 pp. 805-811 vol. 2 Digital Object Identifier 10.1109/APEC.2005.*

Modeling and robust control design for aircraft brake hydraulics Tunay, I.; Rodin, E.Y.; Beck, A.A.; Control Systems Technology, IEEE Transactions on vol. 9, Issue 2, Mar. 2001 pp. 319-329 Digital Object Identifier 10.1109/87.911383.*

Novel bidirectional linear actuator for electrohydraulic valves Qipeng Li; Fan Ding; Chuanli Wang; Magnetics, IEEE Transactions on vol. 41, Issue 6, Jun. 2005 pp. 2199-2201 Digital Object Identifier 10.1109/TMAG.2005.847632.*

Control of power-shuttle motion-inverter Savaresi, S.M.; Tanelli, M.; Bittanti, S.; Mangili, A.; Taroni, F.; Previdi, F.; American Control Conference, 2005. Proceedings of the 2005 Jun. 8-10, 2005 pp. 1010-1015 vol. 2 Digital Object Identifier 10.1109/ACC.2005.1470092.*

Optimal and robust design of unstable valve Qinghui Yuan; Perry Li; American Control Conference, 2004. Proceedings of the 2004 vol. 5, Jun. 30-Jul. 2, 2004 pp. 4449-4452 vol. 5.*

An experimental study on the use of unstable electrohydraulic valves for control Qinghui Yuan; Li, P.Y.; American Control Conference, 2002. Proceedings of the 2002 vol. 6, May 8-10, 2002 pp. 4843-4848 vol. 6 Digital Object Identifier 10.1109/ACC.2002.1025425.*

On using unstable electrohydraulic valves for control Krishnaswamy, K.; Li, P.Y.; American Control Conference, 2000. Proceedings of the 2000 vol. 5, Jun. 28-30, 2000 pp. 3615-3619 vol. 5 Digital Object Identifier 10.1109/ACC.2000.879244.*

Passivity properties and passification of electrohydraulic valves Li, P.Y.; American Control Conference, 2000. Proceedings of the 2000 vol. 6, Jun. 28-30, 2000 pp. 4108-4113 vol. 6 Digital Object Identifier 10.1109/ACC.2000.876994.*

Prototype design and test results of a high temperature remote actuator controller Fong Shi; Martin, K.; High Temperature Electronics Conference, 1998. HITEC. 1998 Fourth International Jun. 14-18, 1998 pp. 1-4 Digital Object Identifier 10.1109/HITEC.1998.676750.*

Online state and parameter estimation of an electrohydraulic valve for intelligent monitoring Khoshzaban, M.; Sassani, F.; Lawrence, P.D.; Advanced Intelligent Mechatronics '97., IEEE/ASME International Conference on Jun. 16-20, 1997 p. 141 Digital Object Identifier 10.1109/AIM.1997.653015.*

An assessment of developing dual use electric actuation technologies for military aircraft and commercial application Blanding, D.E.; Energy Conversion Engineering Conference, 1997. IECEC-97. Proceedings of the 32nd Intersociety vol. 1, Jul. 27-Aug. 1, 1997 pp. 716-721 vol. 1 Digital Object Identifier 10.1109/IECEC.1997.659278.*

* cited by examiner

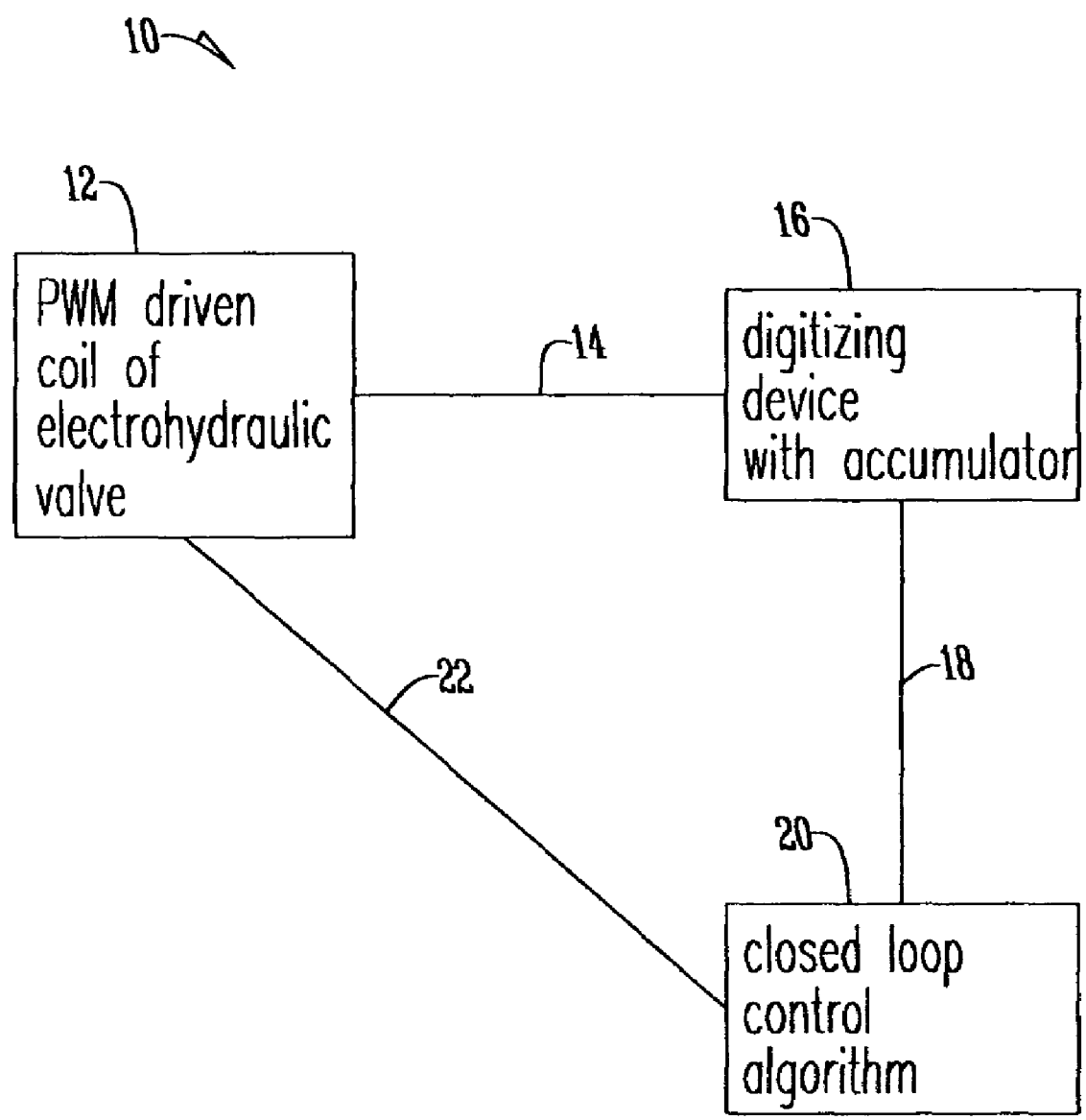

METHOD OF DETERMINING AVERAGE CURRENT IN A PWM DRIVE

BACKGROUND OF THE INVENTION

PWM (pulse width modulator) drives are often used to drive electromagnetic actuators or devices with coils. The PWM drive is beneficial because it can efficiently drive heavy inductive loads with little power lost in the PWM drive throughout the entire control range (0 to 100% duty cycle). The coil can act on a mechanical object by means of a magnetic field created by the current in the coil. The magnitude of the magnetic field is directly proportional to the current in the coil so it is important to control or monitor this current. The magnitude of the current can be predicted by dividing the average voltage across the coil by an assumed coil resistance, but because the coil resistance is a strong function of temperature and the temperature can change dramatically as the coil is being driven, this prediction is often insufficient. Many applications use current feedback and closed loop control on this feedback.

When a coil is driven by PWM, the current in the coil is constantly changing. The PWM drive applies a square wave voltage pattern to the coil and hence when the voltage is high, the current is increasing, when the voltage is low, the current is decreasing. The PWM frequency is typically much higher than the response time of the mechanical object being acted on by the coil, so the instantaneous current within the cycle of the PWM is not of value, but the average current is important. Consequently, the feedback variable required is the average current. Very often an Infinite Impulse Response (lag, etc.) filter is used on the feedback signal to yield the average current going to the coil. This inherently adds significant lag to the feedback signal and hence slows the response of the control.

Therefore, there is a need in the art for a method of calculating the average current within the cycle of a PWM that eliminates lag in the feedback signal. By eliminating the lag in the feedback an improved PWM driving circuit would be produced.

Consequently, it is a primary object of the present invention to provide a method of calculating the average current within a PWM cycle using a Finite Impulse Response (FIR) to minimize lag in the feedback signal.

Yet another object of the present invention is to speed up the response of the control of a PWM cycle.

Another object of the present invention is to use a method of calculating an average current within the cycle of a PWM that drives an electrohydraulic valve to improve performance of the valve.

These and other objects, features, or advantages of the present invention will become apparent from the specification and the claims.

BRIEF SUMMARY OF THE INVENTION

The present invention is a method of driving an electrohydraulic valve with a PWM drive. The method includes transmitting a feedback signal to a digitizing device that is a finite impulse response filter that samples the signal. The samples are collected in an accumulator where an average value is calculated and sent to an algorithm. The algorithm controls the pulse width of the PWM signal to drive the coil of the electrohydraulic valve.

BRIEF DESCRIPTION OF THE DRAWINGS

The FIGURE is a schematic block diagram of the method of the present invention.

DETAILED DESCRIPTION OF THE INVENTION

The present invention is a closed loop cycle 10 that has a PWM driven coil of an electrohydraulic valve 12. The coil 12 electrically transmits a feedback signal 14 to the digitizing device with accumulator 16, or Finite Impulse Response filter. The digitizing device 16 sends a signal 18 to the closed loop control algorithm 20. The algorithm 20 then sends a pulse width signal 22 back to the PWM driver 12 to complete the cycle 10.

In operation the cycle 10 begins at the PWM driven coil of the electrohydraulic valve 12 wherein the PWM drive produces a feedback signal 14. The signal is fed into the digitizing device 16. In the digitizing device 16 the signal 14 is sampled at a rate high enough so that multiple samples per PWM period, or a plurality of samples, are taken. Each time a sample is taken, the digital value is added to the accumulator within the digitizing device 16. At a given, fixed location within the PWM cycle 10, the accumulator is divided by the number of samples within the cycle 10. This yields the average value of the current within one cycle 10. This result is passed to the closed loop control algorithm 20 via signal 18 to determine the pulse width of the next cycle 10 via pulse width signal 22. The accumulator is reset to zero and the cycle 10 starts over again.

The digitizing device 16 in a preferred embodiment is an AtoD converter. However, a DSP, a microcontroller, or any device capable of sampling the feedback signal 14 at a given rate would also be applicable. The closed loop control algorithm 20 in a preferred embodiment preferably would be a PI or PID; however any other algorithm that can determine the pulse width from signal 18 provided by the digitizing device 16 will suffice.

By using the method described, the feedback signal 14 has a lower lag than in prior art devices that use Infinite Impulse Response filters. With this very small lag, the control algorithm 20 is tuned for fast response and is still able to maintain stability. This fast response is increasingly important as total system performance is gaining focus and more and more electronics are used for various types of machine control. Thus the electrohydraulic valve performs at an optimum level. Consequently, all of the stated objectives are achieved.

It will be appreciated by those skilled in the art that other various modifications could be made to the device without the parting from the spirit in scope of this invention. All such modifications and changes fall within the scope of the claims and are intended to be covered thereby.

What is claimed is:

1. A method of driving the coil of an electrohydraulic valve with a pulse width modulator drive, comprising:
   transmitting a feedback signal to a digitizing device that is electrically connected to the electrohydraulic valve;
   sampling the feedback signal within the digitizing device to create a plurality of signal samples within one pulse width modulator cycle;
   transmitting the plurality of samples to an accumulator;
   averaging the plurality of samples within the accumulator to create an average value; and
   transmitting the average value to a closed loop control algorithm that generates a pulse width signal to drive the coil of the electrohydraulic valve;

wherein the accumulator resets when the algorithm sends the pulse width signal to the coil of the electrohydraulic valve such that the method of driving the coil of an electrohydraulic valve with a pulse width modulator drive starts over again for a next pulse width modulator cycle.

2. The method of claim 1 wherein the digitizing device is an AtoD converter.

3. The method of claim 1 wherein the digitizing device is a DSP.

4. The method of claim 1 wherein the digitizing device is a micro controller.

5. The method of claim 1 wherein the algorithm is a PI algorithm.

6. The method of claim 1 wherein the algorithm is a PID algorithm.

7. A method of driving a pulse width modulator comprising:
    transmitting a feedback signal from the pulse width modulator to a finite impulse response filter;
    calculating an average current in the signal within one pulse modulator cycle with the finite impulse response filter; and
    generating a pulse width signal in response the average current in the signal via an algorithm.

8. A method of driving the electric coil of a machine with a pulse width modulator comprising:
    transmitting a feedback signal to a digitizing device that is electrically connected to the electric coil of the machine;
    calculating the amount of average current in the coil within one pulse width modulator cycle with the digitizing device;
    transmitting the average current amount to an algorithm;
    generating a pulse width signal in response to the average current in the coil with the algorithm.

9. The method of claim 1 wherein the digitizing device is a finite impulse response filter.

* * * * *